May 12, 1942.   S. ALBERT   2,282,316
ELECTRODE HOLDER AND CABLE UNIT
Filed Oct. 31, 1939   2 Sheets-Sheet 1

INVENTOR.
Samuel Albert
BY Caesar and Rivise
ATTORNEYS

May 12, 1942.    S. ALBERT    2,282,316
ELECTRODE HOLDER AND CABLE UNIT
Filed Oct. 31, 1939    2 Sheets-Sheet 2
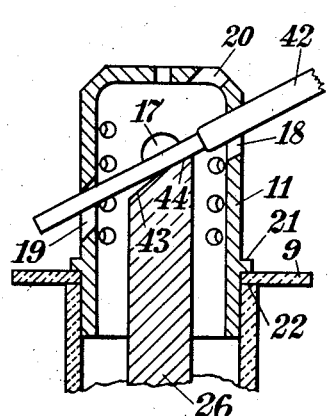
Fig. 8
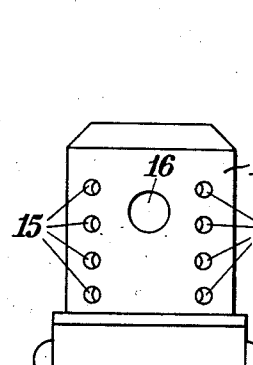
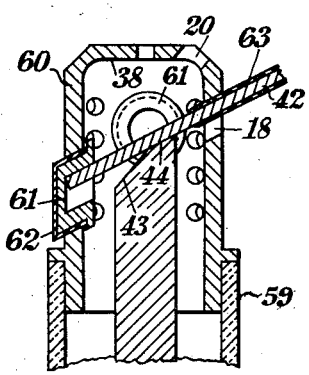
Fig. 12
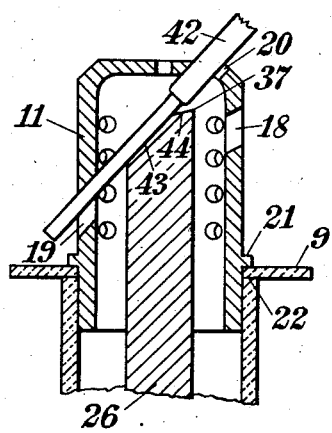
Fig. 9
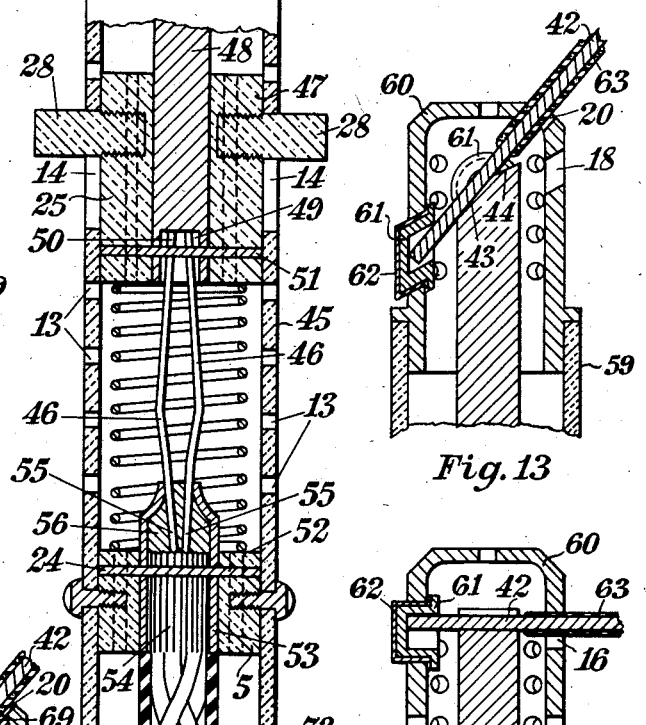
Fig. 11
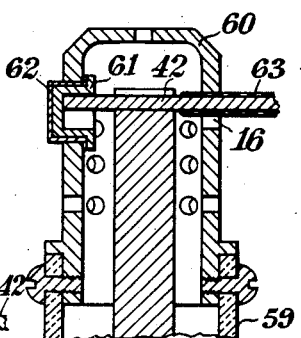
Fig. 13
Fig. 10
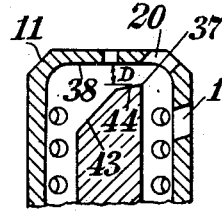
Fig. 16
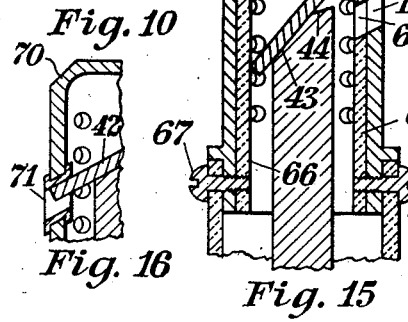
Fig. 15
Fig. 14
Fig. 17
INVENTOR.
Samuel Albert
BY
Caesar and Rivise
ATTORNEYS Patented May 12, 1942

2,282,316

UNITED STATES PATENT OFFICE 2,282,316

ELECTRODE HOLDER AND CABLE UNIT

Samuel Albert, Philadelphia, Pa.

Application October 31, 1939, Serial No. 302,101

16 Claims. (Cl. 219—8)

This application is a continuation in part of application Serial No. 211,537 which I filed on June 3, 1938 for an improvement in Electric arc welding handles and of application Serial No. 268,466 which I filed on April 18, 1939 for an improvement in Electrode holders and cable units.

This invention relates to electrode holders and cable units used in the electric welding process and has as one of its objects the production of a new and improved electrode holder and cable unit which will be comparatively simple in construction so that it may be readily made, assembled, and used.

Another object of this invention is to produce an electrode holder which will not ground itself or spark in the event that any part thereof comes into contact with a metallic surface when the electrode holder is holding an electrode.

Another object of this invention is to produce an electrode holder which will not ground itself or spark in the event that any part thereof comes into contact with a metallic surface at least during the period when the electrode holder is not holding an electrode.

Another object of this invention is to produce an electrode holder wherein the necessity of bending the electrode in order to make it contact with the welding locus has been reduced to a minimum.

Another object of this invention is to produce an electrode holder which will have a longer life than the electrode holders now in general use.

Another object of this invention is to produce an electrode holder and cable unit of the slidable clamping bar type wherein a pull or other undue pressure upon the cable will not result in any movement of the slidable clamping bar.

I attain the foregoing, as well as other, objects by forming my electrode holder of a main body member of non-conducting material terminating in a metallic head made preferably of non-magnetic metallic material, such as non-magnetic high tensile manganese bronze, by providing the body member with means for fixedly attaching thereto one of the free ends of the cable, by mounting a clamping bar for sliding movement in said body member and yet so positioning said clamping bar that an insulating medium separates said clamping bar from said main body member, by connecting said slidable clamping bar and said cable by some flexible means, by providing means which will normally urge said clamping bar in the direction necessary to clamp an electrode, and by providing the metallic head with elements made of non-conducting material for receiving the free end of said electrode. By omitting from the metallic head the elements made of non-conducting material which receive the free end of the electrode, one produces a unit wherein sparking will occur only when the electrode holder is carrying an electrode and the metallic head contacts with a metallic surface. Sparking will not occur in such a unit under conditions where the electrode holder is not carrying an electrode and the metallic head contacts a metallic surface.

For the purpose of illustrating my invention I have shown in the drawings, which form a part hereof, and will now describe two of the many possible structures into which my inventive concepts may be incorporated.

In said drawings, Figure 1 is an elevation of my novel electrode holder and cable unit with the electrode in the horizontal position. This electrode is held in this position when the welding locus is on a horizontal surface such as a floor. The dot and dash lines show the position of the clamping bar when the electrode holder is not holding an electrode.

Figure 1:
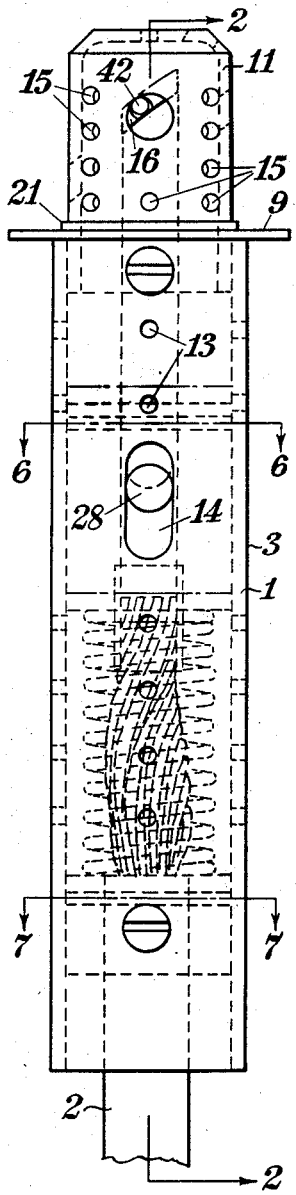
Figure 2:
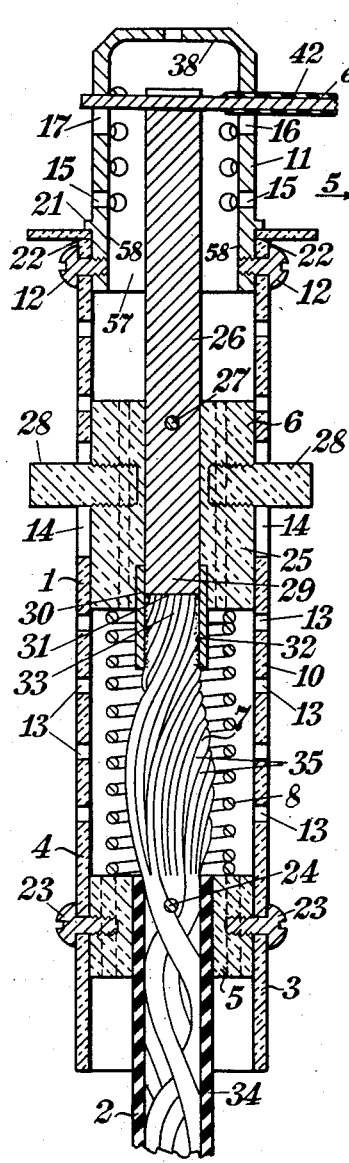
Figure 2 is a section taken along the line 2—2 of Figure 1.
Figure 3:
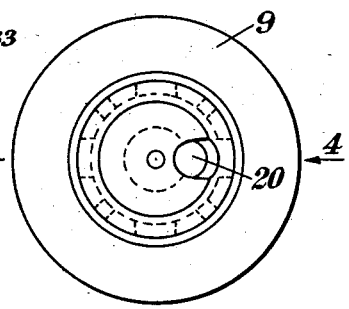
Figure 3 is a top view of the electrode holder shown in Figure 1.
Figure 4:
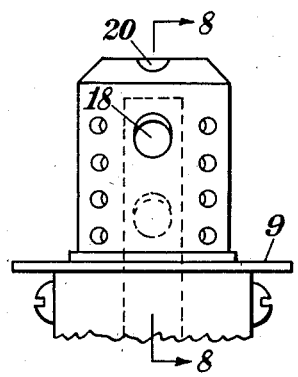

Figure 4 is an elevation of the upper fragment of the electrode holder shown in Figure 1 looking in the direction of the arrow 4 in Figure 3. In this view the electrode holder is not carrying an electrode. The dotted lines show the position of the clamping bar under this condition.

Figure 5:
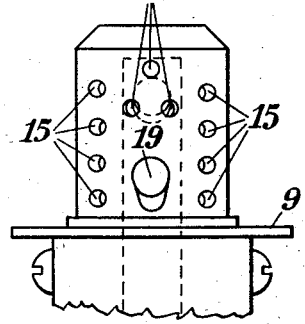

Figure 5 is an elevation of the upper fragment of the electrode holder shown in Figure 1 looking in the direction of the arrow 5 in Figure 3. In this view the holder is not carrying an electrode. The dotted lines show the position of the clamping bar under this condition.

Figure 6:
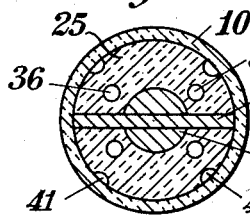

Figure 6 is a section taken on the line 6—6 of Figure 1.

Figure 7:
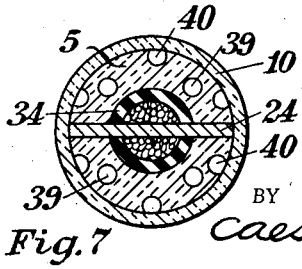

Figure 7 is a section taken on the line 7—7 of Figure 1.

Figure 8 is a section taken along the line 8—8 of Figure 4 when the electrode holder is carrying an electrode in the less inclined of the two angular positions in which the electrode may be held by the electrode holder. This position is used when the welding locus is on a vertical surface such as a wall.

Figure 9 is a section taken similarly to Figure 8 when the electrode holder is holding an electrode in the more inclined of the two angular positions in which the electrode may be held. This position is used when the welding locus is overhead.

Figure 10 is a section of the upper part of the fragment shown in Figures 4 and 5 taken along the line 8—8 of Figure 4 when the electrode holder is not holding an electrode.

Figure 11 is a view partly in section and partly in elevation of a modification of the electrode holder shown in Figures 1 to 10.

Figure 12 is a section, taken similarly to Figure 8, of the upper fragment of still another modification of the electrode holders shown in Figures 1 to 11.

Figure 13 is a section, taken similarly to Figure 9, of the electrode holder fragment shown in Figure 12.

Figure 14 is a section, taken on a line such as 2—2 of Figure 1, of the fragment shown in Figures 12 and 13.

Figure 15 is a section, taken similarly to Figure 13, of a modification of the structure shown in Figures 12 to 14.

Figure 16 is a fragmentary section, taken similarly to Figure 12, of still another modification of the structure shown in Figures 12 to 14.

Figure 17 is a fragmentary section, taken similarly to Figure 14, of a modification of the structure shown in Figure 15.

Referring more particularly to the drawings, wherein similar reference numerals denote similar parts, reference numeral 1 designates my electrode holder and cable unit shown in Figures 1 to 10. The electrode holder and cable unit 1 consists of the cable portion 2 and the electrode holder 3.

The electrode holder 3 comprises the hollow casing 4, the cable anchoring member 5, the slidable clamping bar member 6, the flexible means 7 connecting the cable 2 to the slidable clamping bar 26, the spring 8 which normally urges the slidable clamping bar towards its bar clamping position, and the protecting ring 9.

The hollow casing 4 consists of a tubular main body portion 10 and a cap portion 11 which is attached to the main body portion 10 by means of suitable screws 12. The main body portion 10 is made of rigid non-conducting material, such as hard fiber, and has formed therein a plurality of ventilating apertures 13 and the two oppositely disposed slots 14—14. The cap portion 11 is made of metal, preferably non-magnetic high tensile manganese bronze, and has formed therein a plurality of ventilating apertures 15 and the welding rod apertures 16, 17, 18, 19 and 20. The cap portion 11 also has formed thereon near the lower end thereof the flange 21 which serves to hold in position the annular protecting ring 9 which is seated upon the upper face 22 of the tubular main body member 10. The annular protecting ring 9 is made of rigid non-conducting material, such as hard fiber.

The cable anchoring member 5 is a cylinder made of non-conducting material, such as hard fiber, and has formed therein a plurality of bores 39 and flutes 40 through which particles formed during the welding operation may fall in the event that they should enter the casing 4 of the electrode holder through any of the apertures formed in said casing. The cable anchoring member 5 is attached to the main body portion 10 of the casing 4 by suitable means such as the screws 23. The cable anchoring member 5 has a suitable bore formed therein centrally thereof through which the cable 2 extends. The cable 2 is fixedly attached to the cable anchoring member 5 by means of the pin 24 which extends through said cable 2 and said cable anchoring member 5.

The slidable clamping bar member 6 comprises a cylindrical base 25 formed of non-conducting material, such as hard fiber, the clamping bar 26, and the finger pieces 28. The finger pieces 28 are threadably attached to the base 25. The clamping bar 26 extends through a suitable bore formed centrally in the base 25 and is fixedly attached to said base 25 by means of the pin 27. It is to be noted that the clamping bar 26 is so positioned that an insulating medium separates it from both the main body portion 10 and the cap portion 11 of the casing 4. This insulating medium is the cylindrical base 25 in which the lower end of said clamping bar 26 is anchored and the air which surrounds that portion of the clamping bar 26 which extends above said cylindrical base 25. The air space 57 which separates the clamping bar 26 from the inner surface 58 and the inner face 38 of the cap portion 10 must be sufficiently wide at its narrowest point to keep an arc from jumping from the clamping bar 26 to either the inner surface 58 or the inner face 38 of the cap portion 11 at the voltage at which the welding operation is to take place in the event that the cap 11 is touched to a grounded metal surface when there is no welding rod 42 in the rod holder. In the specific embodiment here shown the handle is designed for use with voltages up to 90 at 400 amperes and the width of said air space at its narrowest point is one-eighth of an inch (1/8"). The lower end 29 of the clamping bar 26 has attached thereto the tube 30 which extends a distance beyond the end 31 of the clamping bar and forms an inverse cup member 32 which receives the upper end 33 of the flexible means 7 connecting the cable 2 to the slidable clamping bar 26. The flexible means 7 is a continuation of the cable 2 from which the insulation 34 has been stripped and the strands 35 of which have been unravelled. The connection between the end 33 and inverse cup 32 may be a force fit, or a force fit supplemented by hard solder, or the end 33 may be loosely received within the inverse cup 32 and anchored therein by means of hard solder. The base 25 has formed therein a plurality of bores 36 and flutes 41 through which particles formed during the welding operation may fall in the event that they should enter the cap portion 11 through any of the apertures formed in said cap.

The spring 8 is positioned in the tubular portion 10 of the casing 4 between the cable anchoring member 5 and the base 25 of the slidable clamping bar member 6 and is of such length that, when uncompressed, it will hold the slidable clamping bar member 6 at a point where the uppermost edge 37 of the clamping bar 26 will be at a substantial distance D from the lower face 38 of the cap 11, thereby forming a substantial air space between the uppermost edge of the clamping bar 26 and the lower face 38 of the cap 11. This air space is part of the air space 57. This distance D must be such that the air space is sufficient to keep an arc from jumping from the edge 37 of the bar 26 to the face 38 of the cap 11 at the voltage at which the welding operation is to take place in the event that the cap 11 is touched to a grounded metal surface when there is no welding rod 42 in the holder. As has been previously stated, in the specific embodiment here shown the handle is designed for use with voltages up to 90 at 400 amperes and the distance D is one-eighth of an inch (1/8"). The distance D which separates the clamping bar 26 from any metallic surface of the rod holder which may contact a grounded metal surface can readily be computed by means of the well known formulae since all of the necessary factors are known and the factor of safety desired can always be assumed.

The spring 8 is of such strength that when compressed the distance necessary to permit the clamping bar 26 to move from its uncompressed position shown by the dot and dash lines in Figure 1 to the clamping positions shown in Figures 1, 2, 8 and 9 the tensional force set up in the spring 8 will be sufficient to cause the face 43 or 44 of the clamping bar 26 to press the welding rod 42 with sufficient force against the upper faces of the apertures 16, 17, 18, 19 and 20 to firmly hold the rod 42 against displacement during the welding operation.

The electrode holder and cable unit 45 shown in Figure 11 differs from that shown in Figures 1 to 10 in the following particulars:

(1) A pair of flexible wire strands 46 have been substituted for the unravelled cable wire strands 35. These strands 46 are the equivalent of the flexible connecting means 7 of Figures 1 to 10.

(2) The clamping bar member 47 has been substituted for the clamping bar member 6. The clamping bar member 47 differs from the clamping bar member 6 in the fact that the clamping bar 48 thereof terminates at its lower end in an inverse cup-shaped chamber 49 and in the fact that the anchoring pin 51 has been substituted for the anchoring pin 27.

(3) The upper ends 50 of the flexible strands 46 extend into the chamber 49 and are anchored to the clamping bar 48 by the pin 51 which also anchors the clamping bar 48 to the base 25. If desired, hard solder may be used in lieu of or as a supplement to the pin 51 for anchoring the upper ends 50 of the flexible strands 46 to the clamping bar.

(4) The insulation 34 has been stripped from the cable to the point where the cable enters the bore in the cable anchoring member 5, the strands of the cable have been cut so as to terminate at the upper surface 52 of the cable anchoring member 5, a cylindrical tube 53 has been forced over the stripped end 54 of the cable 2 and the lower ends 55 of the flexible strands 46 have been anchored within the cylindrical tube by means of hard solder 56. If desired, hard solder may be used either to supplement or in lieu of the force fit connection between the tube 53 and the stripped end 54. Where hard solder is used in lieu of the force fit, the internal diameter of the tube 53 is made somewhat greater than the external diameter of the stripped end 54.

(5) The pin 24 extends through the cable anchoring member 5, the cylindrical tube 53 and the cable and anchors the cable 2 and cylindrical tube 53 to the cable anchoring member.

The electrode holder and cable unit 59 shown in Figures 12 to 14 differs from the unit 1 shown in Figures 1 to 10 only in the following particulars:

(1) The metallic cap 60 differs from the metallic cap 11 in the fact that the cup-like elements 61 made of non-conducting material have been positioned in the walls thereof at the points where the apertures 17 and 19 were formed in the metallic cap 11. The outer surface of each of the cup-like elements 61 is preferably sheathed with a metal 62, such as copper, which is a good conductor of heat. The metal sheathing 62 may be omitted if desired. These cup-like elements 61 receive the lower end of the welding rod 42. Because the cup-like elements 61 are made of non-conducting material and because the welding rods 42 have a coating of insulating material 63 at the point where they go through the apertures 16, 18 and 20, the metallic cap 60 is completely insulated from the welding rod 42, and as a result the electrode holder will not ground itself or arc in the event any part thereof comes into contact with a grounded metallic surface when the electrode holder is holding an electrode.

(2) The protecting ring 9 has been omitted.

The metallic cap 64 shown in Figure 15 differs from the metallic cap 60 in the fact that apertures 17 and 19 have been eliminated and the fact that a cup-like lining 65 of insulating material has been substituted for the cup-like elements 61. The lining 65 is attached to the metallic portion of the cap 64 by screws 67. The lining 65 has formed therein a suitable aperture 68 which registers with the aperture 18 and a suitable aperture 69 which registers with the aperture 20. If desired, the lining may be in the form of a collar 74 as shown in the cap 72 in Figure 17 and may have formed therein cup-like indentations 73 which receive the ends of the electrode 42.

The metallic cap 70 differs from that shown in Figures 12 to 14 in the fact that the eyelets 71 made of insulating material have been substituted for the cup-like elements 61.

The portion of the electrode holder and cable unit shown in Figures 12 to 14 may also be considered as the upper fragment of the electrode holder and cable unit shown in Figure 11 which has been modified in exactly the same manner as the electrode holder and cable unit shown in Figures 1 to 10—namely, the ring 9 has been omitted and the metallic cap 60 has been substituted for the metallic cap 11.

Similarly, the portion of the electrode holder and cable unit shown in Figures 15 or 17 may also be considered as the upper fragment of the electrode holder and cable unit shown in Figures 1 to 10 or 11 which have been modified by substituting the metallic cap 64 or the metallic cap 72 for the metallic cap 11. It is to be noted that I prefer to leave a substantial air space between the inner surface 66 of the element 65 and the outer surface of the rod 26 or 48.

Similarly, the portion of the electrode holder and cable unit shown in Figure 16 may also be considered as the upper fragment of the electrode holder and cable unit shown in Figures 1 to 10 or 11 which have been modified by substituting the metallic cap 70 for the metallic cap 11.

By making the casing 4 of a main body portion of non-conducting material terminating in a metallic cap portion, I impart comparatively long life to the holder. Were the casing made entirely of fiber, the heat engendered during welding would cause the fiber in the vicinity of the cap to deteriorate rapidly. The life of this portion of the unit when made of fiber is seldom more than one day.

By mounting the clamping bar so that it is not in contact with any part of the casing and so that an air space of substantial size separates the clamping bar from the casing, I am able to use a metal cap portion as part of the casing and yet not ground the holder when the holder is not clamping a rod and the cap portion touches a metallic surface.

By providing the metallic cap with either eyelets, or cup-like elements, or with a hollow cylinder made of non-conducting material, I eliminate grounding or arcing when any part of the electrode holder comes into contact with a grounded metallic surface when the electrode holder is holding an electrode. Among other things, this eliminates the danger of grounding or arcing when the welding operation is being carried out in tight corners.

By anchoring the cable to the body member of the electrode holder but not to the slidable clamping bar member, I eliminate all movement in the slidable clamping bar resulting in prior art devices when some one accidentally exerted any undue pressure upon the cable.

By providing a flexible electrical connection between the cable and the slidable clamping bar, I am enabled to further simplify the construction of the unit and to make a structure wherein the cable is anchored to the body member of the electrode holder and not to the slidable clamping bar member.

The foregoing disclosure is to be understood as being by the way of illustration only and not by the way of limitation since many changes may be made in the structure herein shown without departing from the spirit of my invention. For this reason it is my desire that the claims which are hereunto appended for the purpose of defining my invention should be limited only by the prior art.

Having described my invention, what I claim as new and useful is:

1. An electrode holder and cable unit comprising a casing; an electric cable anchored in the lower part of said casing; a clamping bar mounted for sliding movement in said casing above said electric cable; flexible electrical conducting means positioned within said casing intermediate said clamping bar and said electric cable and attached at one of its ends to said clamping bar and at the other of its ends to said electric cable; and resilient means positioned in said casing for normally urging said clamping bar away from said electric cable.

2. An electrode holder and cable unit comprising a hollow casing having a body portion of non-conducting material and terminating in a metallic cap portion; insulating means carried by said metallic cap portion and positioned for contacting one of the ends of the electrode which is to be held by said electrode holder; an electric cable anchored in the lower part of said casing; a clamping bar mounted for sliding movement in said casing above said electric cable; at least one finger piece attached to said clamping bar; flexible electrical conducting means positioned within said hollow casing intermediate said clamping bar and said electric cable and attached at one of its ends to said clamping bar and at the other of its ends to said cable; and a helical spring positioned within said casing intermediate said clamping bar and said cable for normally urging said clamping bar away from said cable.

3. An electrode holder and cable unit comprising a hollow casing having a body portion of non-conducting material and terminating in a metallic cap portion; cup-like elements made of insulating material carried by said metallic cap portion and positioned for receiving one of the ends of the electrode which is to be held by said electrode holder; a cable anchoring member anchored in the lower part of said casing; an electric cable anchored in said cable anchoring member; a clamping bar mounted for movement within said casing; flexible electrical conducting means positioned within said hollow casing intermediate said clamping bar and said cable and attached at one of its ends to said clamping bar and at the other of its ends to said electric cable; and resilient means positioned within said casing for normally urging said clamping bar away from said cable anchoring means.

4. An electrode holder and cable unit comprising a hollow casing having a body portion of non-conducting material and terminating in a metallic cap portion; a cable anchoring member of non-conducting material fixedly attached to said hollow casing near the lower end thereof; an electric cable extending into and fixedly attached to said cable anchoring member; a clamping bar carrying base made of non-conducting material slidably positioned within said casing above said base; at least one finger piece attached to said clamping bar carrying base; a clamping bar of conducting material carried by said clamping bar carrying base; a plurality of flexible wires made of conducting material positioned within said hollow casing intermediate said cable and said clamping bar; means connecting the upper end of said flexible wires to said clamping bar; means connecting the lower end of said wires to said electric cable; and a helical spring positioned within said hollow casing intermediate said cable anchoring member and said clamping bar carrying base for normally urging said clamping bar carrying base away from said cable anchoring member.

5. An electrode holder comprising a hollow casing made of non-conducting material; a hollow base of non-conducting material fixedly attached to said hollow casing near the lower end thereof; an electric cable extending into and fixedly attached to said hollow base; an electrode bar carrying base made of non-conducting material slidably positioned within said hollow casing near the upper end thereof, said base being made of non-conducting material and said electrode bar carried by said base being made of conducting material; a plurality of flexible bars made of conducting material positioned within said hollow casing intermediate said cable and said electrode bar; means connecting the upper end of each of said flexible bars to said electrode bar; means connecting the lower end of each of said bars to said electric cable; and a helical spring positioned within said hollow casing intermediate said hollow base and said electrode bar carrying base for normally urging said electrode bar carrying base away from said hollow base.

6. An electrode holder and cable unit comprising a hollow casing having a body portion of non-conducting material and terminating in a metallic cap portion; a cable anchoring member of non-conducting material having a cable receiving bore formed therein fixedly attached to said hollow casing near the lower end thereof; an electric cable extending into and fixedly attached to said cable anchoring member; a clamping bar carrying base made of non-conducting material slidably positioned within said casing above said base; at least one finger piece attached to said clamping bar carrying base; a clamping bar of conducting material attached to said clamping bar carrying base near one of the ends of said clamping bar and not touching said casing for the remainder of the length of said clamping bar; a plurality of flexible wires made of conducting material positioned within said hollow casing intermediate said electric cable and anchoring member and said clamping bar; means connecting the upper end of said flexible wires to said clamping bar; means connecting the lower end of said wires to said electric cable anchoring member; and a helical spring positioned within said hollow casing intermediate said cable anchoring member and said clamping bar carrying base for normally urging said clamping bar carrying base away from said cable anchoring member.

7. An electrode holder unit comprising a casing; an electric cable anchoring member fixedly positioned in said casing; a clamping bar mounted for sliding movement in said casing above said electric cable anchoring member; flexible electrical conducting means positioned within said casing intermediate said clamping bar and said electric cable anchoring member and attached at one of its ends to said clamping bar and at the other of its ends to said electric cable anchoring member; and resilient means positioned in said casing for normally urging said clamping bar away from said electric cable anchoring member.

8. An electrode holder comprising a hollow casing having a body portion of non-conducting material and terminating in a metallic cap portion; insulating means carried by said metallic cap portion and positioned for contacting one of the ends of the electrode which is to be held by said electrode holder; an electric cable anchoring member anchored in the lower part of said casing; a clamping bar mounted for sliding movement in said casing above said electric cable anchoring member; at least one finger piece attached to said clamping bar; flexible electrical conducting means positioned within said hollow casing intermediate said clamping bar and said electric cable anchoring member and attached at one of its ends to said clamping bar and at the other of its ends to said cable; and a helical spring positioned within said casing intermediate said clamping bar and said cable anchoring member for normally urging said clamping bar away from said cable anchoring member.

9. An electrode holder comprising a hollow casing having a body portion of non-conducting material and terminating in a metallic cap portion; cup-like elements made of insulating material carried by said metallic cap portion and positioned for receiving one of the ends of the electrode which is to be held by said electrode holder; an electric cable anchoring member having a cable receiving bore formed therein anchored in the lower part of said casing; a clamping bar mounted for movement within said casing; at least one finger piece attached to said clamping bar; flexible electrical conducting means positioned within said hollow casing intermediate said clamping bar and said cable anchoring member and attached at one of its ends to said clamping bar and at the other of its ends to said electric cable anchoring member; and resilient means positioned within said casing for normally urging said clamping bar away from said cable anchoring member.

10. An electrode holder comprising a hollow casing having a body portion of non-conducting material and terminating in a metallic cap portion; a cable anchoring member of non-conducting material having a cable receiving bore formed therein fixedly attached to said hollow casing near the lower end thereof; a clamping bar carrying base made of non-conducting material slidably positioned within said casing above said base; at least one finger piece attached to said clamping bar carrying base; a clamping bar of conducting material carried by said clamping bar carrying base; a plurality of flexible wires made of conducting material positioned within said hollow casing intermediate said electric cable anchoring member and said clamping bar; means connecting the upper end of said flexible wires to said clamping bar; means connecting the lower end of said wires to said electric cable anchoring member; and a helical spring positioned within said hollow casing intermediate said cable anchoring member and said clamping bar carrying base for normally urging said clamping bar carrying base away from said cable anchoring member.

11. An electrode holder comprising a hollow casing having a body portion of non-conducting material and terminating in a metallic cap portion; a cable anchoring member of non-conducting material having a cable receiving bore formed therein fixedly attached to said hollow casing near the lower end thereof; a clamping bar carrying base made of non-conducting material slidably positioned within said casing above said base; at least one finger piece attached to said clamping bar carrying base; a clamping bar of conducting material attached to said clamping bar carrying base near one of the ends of said clamping bar and not touching said casing for the remainder of the length of said clamping bar; a plurality of flexible wires made of conducting material positioned within said hollow casing intermediate said electric cable anchoring member and said clamping bar; means connecting the upper end of said flexible wires to said clamping bar; means connecting the lower end of said wires to said electric cable anchoring member; and a helical spring positioned within said hollow casing intermediate said cable anchoring member and said clamping bar carrying base for normally urging said clamping bar carrying base away from said cable anchoring member.

12. An electrode holder comprising a hollow casing having a body portion of non-conducting material and terminating in a metallic cap portion; insulating means positioned in said metallic cap portion for contacting one of the ends of the electrode which is to be held by said electrode holder; a cable anchoring member of non-conducting material having a cable receiving bore formed therein fixedly attached to said hollow casing near the lower end thereof; a clamping bar carrying base made of non-conducting material slidably positioned within said casing above said base; a lever attached to said clamping bar carrying base; a clamping bar of conducting material carried by said clamping bar carrying base; a plurality of flexible wires made of conducting material positioned within said hollow casing intermediate said electric cable anchoring member and said clamping bar; means connecting the upper end of said flexible wires to said clamping bar; means connecting the lower end of said wires to said electric cable anchoring member; and a helical spring positioned within said hollow casing intermediate said cable anchoring member and said clamping bar carrying base for normally urging said clamping bar carrying base away from said cable anchoring member.

13. An electrode holder comprising a hollow casing having a body portion of non-conducting material and terminating in a metallic cap portion; insulating means positioned in said metallic cap portion for contacting one of the ends of the electrode which is to be held by said electrode holder; a cable anchoring member of non-conducting material having a cable receiving bore formed therein fixedly attached to said hollow casing near the lower end thereof; a clamping bar carrying base made of non-conducting material slidably positioned within said casing above said base; at least one finger piece attached to said clamping bar carrying base; a clamping bar of conducting material attached to said clamping bar carrying base near one of the ends of said clamping bar and not touching said casing for the remainder of the length of said clamping bar; a plurality of flexible wires made of conducting material positioned within said hollow casing intermediate said electric cable anchoring member and said clamping bar; means connecting the upper end of said flexible wires to said clamping bar; means connecting the lower end of said wires to said electric cable anchoring member; and a helical spring positioned within said hollow casing intermediate said cable anchoring member and said clamping bar carrying base for normally urging said clamping bar carrying base away from said cable anchoring member.

14. An electrode holder comprising a hollow casing having a body portion of non-conducting material and terminating in a metallic cap portion; eyelets made of insulating material carried by said metallic cap portion and positioned for receiving one of the ends of the electrode which is to be held by said electrode holder; an electric cable anchoring member having a cable receiving bore formed therein anchored in the lower part of said casing; a clamping bar mounted for movement within said casing; a lever attached to said clamping bar; flexible electrical conducting means positioned within said hollow casing intermediate said clamping bar and said cable anchoring member and attached at one of its ends to said clamping bar and at the other of its ends to said electric cable anchoring member; and resilient means positioned within said casing for normally urging said clamping bar away from said cable anchoring member.

15. An electrode holder and cable unit comprising a hollow casing having a body portion of non-conducting material and terminating in a metallic cap portion; insulating means positioned in said metallic cap portion for contacting one of the ends of the electrode which is to be held by said electrode holder; a cable anchoring member of non-conducting material having a cable receiving bore formed therein fixedly attached to said hollow casing near the lower end thereof; an electric cable extending into and fixedly attached to said cable anchoring member; a clamping bar carrying base made of non-conducting material slidably positioned within said casing above said base; at least one finger piece attached to said clamping bar carrying base; a clamping bar of conducting material attached to said clamping bar carrying base near one of the ends of said clamping bar and not touching said casing for the remainder of the length of said clamping bar; a plurality of flexible wires made of conducting material positioned within said hollow casing intermediate said electric cable and anchoring member and said clamping bar; means connecting the upper end of said flexible wires to said clamping bar; means connecting the lower end of said wires to said electric cable anchoring member; and a helical spring positioned within said hollow casing intermediate said cable anchoring member and said clamping bar carrying base for normally urging said clamping bar carrying base away from said cable anchoring member.

16. An electrode holder and cable unit comprising a hollow casing having a body portion of non-conducting material and terminating in a metallic cap portion; a collar positioned in said metallic cap portion, said collar being made of insulating material and having depressions formed therein for receiving one of the ends of the electrode which is to be held by said electrode holder; a cable anchoring member of non-conducting material having a cable receiving bore formed therein fixedly attached to said hollow casing near the lower end thereof; an electric cable extending into and fixedly attached to said cable anchoring member; a clamping bar carrying base made of non-conducting material slidably positioned within said casing above said base; at least one finger piece attached to said clamping bar carrying base; a clamping bar of conducting material attached to said clamping bar carrying base near one of the ends of said clamping bar and not touching said casing for the remainder of the length of said clamping bar; a plurality of flexible wires made of conducting material positioned within said hollow casing intermediate said electric cable and anchoring member and said clamping bar; means connecting the upper end of said flexible wires to said clamping bar; means connecting the lower end of said wires to said electric cable anchoring member; and a helical spring positioned within said hollow casing intermediate said cable anchoring member and said clamping bar carrying base for normally urging said clamping bar carrying base away from said cable anchoring member.

SAMUEL ALBERT.